United States Patent
Masaki et al.

(10) Patent No.: US 11,498,145 B2
(45) Date of Patent: Nov. 15, 2022

(54) WELDING METHOD OF DIFFUSION BONDED STRUCTURE

(71) Applicant: IHI CORPORATION, Tokyo (JP)

(72) Inventors: Kunitaka Masaki, Tokyo (JP); Rie Harada, Tokyo (JP); Nagisa Hosoya, Tokyo (JP); Takaaki Matsuoka, Tokyo (JP); Yutaka Mizo, Tokyo (JP)

(73) Assignee: IHI CORPORATION, Tokyo (JP)

( * ) Notice: Subject to any disclaimer, the term of this patent is extended or adjusted under 35 U.S.C. 154(b) by 662 days.

(21) Appl. No.: 16/515,391

(22) Filed: Jul. 18, 2019

(65) Prior Publication Data

US 2019/0337078 A1    Nov. 7, 2019

Related U.S. Application Data

(63) Continuation of application No. PCT/JP2018/001338, filed on Jan. 18, 2018.

(30) Foreign Application Priority Data

Jan. 24, 2017    (JP) .............................. JP2017-010001

(51) Int. Cl.
*B23K 9/04*    (2006.01)
*B23K 9/23*    (2006.01)
*B23K 20/02*    (2006.01)

(52) U.S. Cl.
CPC .................. *B23K 9/04* (2013.01); *B23K 9/23* (2013.01); *B23K 20/028* (2013.01)

(58) Field of Classification Search
CPC . B23K 9/04; B23K 9/23; B23K 9/028; B23K 9/232; B23K 9/0282

USPC .......................... 219/61, 59.1, 101, 76.1, 104
See application file for complete search history.

(56) References Cited

U.S. PATENT DOCUMENTS

| 4,795,078 | A | * | 1/1989 | Kuroki ................. B23K 31/027 228/175 |
| 2007/0221705 | A1 | | 9/2007 | Arnett et al. |
| 2012/0171517 | A1 | | 7/2012 | Yuschak et al. |
| 2016/0240505 | A1 | | 8/2016 | Tatsumi et al. |

(Continued)

FOREIGN PATENT DOCUMENTS

| CN | 101633074 A | | 1/2010 |
| CN | 101633074 A | * | 1/2010 |
| CN | 105127562 A | | 12/2015 |

(Continued)

OTHER PUBLICATIONS

Machine translation of JP 61-49789 performed on Feb. 26, 2022.*

(Continued)

*Primary Examiner* — Tu B Hoang
*Assistant Examiner* — Alba T Rosario-Aponte

(57) ABSTRACT

A welding method of a diffusion bonded structure in which the diffusion bonded structure formed by diffusion bonding metal parts to each other is bonded to another part by fusion welding includes a buffer layer forming step of forming a buffer layer in a welding region including a diffusion bonded joint of the diffusion bonded structure, the buffer layer having greater ductility than the diffusion bonded joint, and a welding step of bonding the welding region in which the buffer layer is formed to the another part by performing the fusion welding from above the buffer layer.

12 Claims, 5 Drawing Sheets

(56) References Cited

U.S. PATENT DOCUMENTS

2016/0312653 A1 10/2016 DiDomizio et al.

FOREIGN PATENT DOCUMENTS

| | | | | |
|---|---|---|---|---|
| CN | 107030359 A | * | 8/2017 | ............ B23K 11/11 |
| EP | 1 837 117 A1 | | 9/2007 | |
| JP | S56-023392 A | | 3/1981 | |
| JP | S61-049789 A | | 3/1986 | |
| JP | H01-103966 A | | 4/1989 | |
| JP | H01-210171 A | | 8/1989 | |
| JP | H07-024577 A | | 1/1995 | |
| JP | 2007-050439 A | | 3/2007 | |
| JP | 2010-234419 A | | 10/2010 | |
| JP | 2010234419 A | * | 10/2010 | |
| JP | 2013-521465 A | | 6/2013 | |
| JP | 5304392 B2 | * | 10/2013 | |
| JP | 2015-093295 A | | 5/2015 | |
| JP | 2016-147311 A | | 8/2016 | |
| JP | 6149789 B2 | * | 6/2017 | |

OTHER PUBLICATIONS

Machine translation of JP 2010-234419 performed on Feb. 26, 2022.*

Sai K. Mylavarapu et al., "Fabrication and design aspects of high-temperature compact diffusion bonded heat exchangers," Nuclear Engineering and Design, vol. 249, pp. 49-56 (2012), Elsevier B.V.

European Patent Office, "Extended European Search Report," issued in European Patent Application No. EP 18 745 129.9, which is a European counterpart of U.S. Appl. No. 16/515,391, dated Oct. 22, 2020, 6 pages.

A. Joseph et al., "Evaluation of residual stresses in dissimilar weld joints," International Journal of Pressure Vessels and Piping, vol. 82, (2005), pp. 700-705, Elsevier Ltd.

China National Intellectual Property Administration, PRC, "First Office Action," issued in Chinese Patent Application No. CN 201880007798.9, which is a Chinese counterpart of U.S. Appl. No. 16/515,391, dated Sep. 29, 2020, 7 pages.

* cited by examiner

WELDING METHOD OF DIFFUSION BONDED STRUCTURE

CROSS REFERENCE TO RELATED APPLICATIONS

This application is a continuation application of International Application No. PCT/JP2018/001338, filed on Jan. 18, 2018, which claims priority to Japanese Patent Application No. 2017-010001, filed on Jan. 24, 2017, the entire contents of which are incorporated by references herein.

BACKGROUND

1. Field

The present disclosure relates to a welding method of a diffusion bonded structure and particularly relates to a welding method of a diffusion bonded structure in which the diffusion bonded structure formed by diffusion bonding metal parts to each other is bonded to another part by fusion welding.

2. Description of the Related Art

In a heat exchanger, a heat exchange reactor, a microchannel apparatus, or the like, components made of diffusion bonded bodies formed by diffusion bonding metal parts to each other are used. When such a diffusion bonded structure is combined with another part to form an assembly, bonding by welding is performed. See Fabrication and design aspects of high-temperature compact diffusion bonded heat exchangers, Nuclear Engineering and Design 249 (2012) 49-56 (Non Patent Literature 1).

SUMMARY

When a diffusion bonded structure formed by diffusion bonding metal parts to each other is bonded to another part by fusion welding, ductility of a diffusion bonded joint of the diffusion bonded structure decreases more at high temperature in the fusing welding than that of the metal parts which are the base metal. Cracking sensitivity in the diffusion bonded joint of the diffusion bonded structure thereby is higher than that in the metal parts. Accordingly, strain caused by the fusion welding may cause cracking in the diffusion bonded joint.

In view of this, an object of the present disclosure is to provide a welding method of a diffusion bonded structure which can suppress cracking in a diffusion bonded joint when a diffusion bonded structure formed by diffusion bonding metal parts to each other is bonded to another part by fusion welding.

A welding method of a diffusion bonded structure according to the present disclosure is a welding method of a diffusion bonded structure in which the diffusion bonded structure formed by diffusion bonding metal parts to each other is bonded to another part by fusion welding, the welding method including a buffer layer forming step of forming a buffer layer in a welding region including a diffusion bonded joint of the diffusion bonded structure, the buffer layer having higher ductility than the diffusion bonded joint, and a welding step of bonding the welding region in which the buffer layer is formed to the another part by performing the fusion welding from above the buffer layer.

In the welding method of a diffusion bonded structure according to the present disclosure, in the buffer layer forming step, the buffer layer may be formed by overlay welding.

In the welding method of a diffusion bonded structure according to the present disclosure, in the buffer layer forming step, the buffer layer may be formed by any one of processes of powder sintering, ultrasonic welding, friction welding, friction surfacing, friction stir welding, friction stir processing, diffusion bonding, brazing, magnetic pulse welding, and explosive welding.

In the welding method of a diffusion bonded structure according to the present disclosure, the diffusion bonded structure may be fusion welded to the another part by a joint welding method.

In the welding method of a diffusion bonded structure according to the present disclosure, the fusion welding by a joint welding method may be patch welding, butt welding, fillet welding, or lap welding.

According to the above configurations, since the buffer layer absorbs and buffers strain caused by the fusion welding, cracking in the diffusion bonded joint of the diffusion bonded structure can be suppressed.

DESCRIPTION OF EMBODIMENTS

Figure 1:
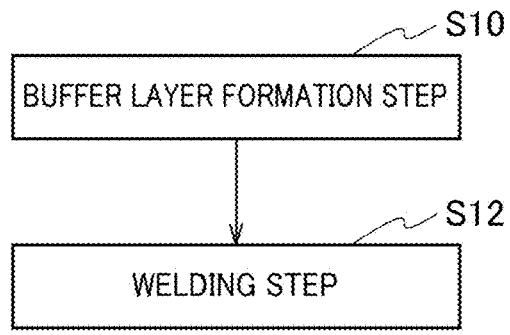
FIG. 1 is a flowchart illustrating a configuration of a welding method of a diffusion bonded structure in an embodiment of the present disclosure.

An embodiment of the present disclosure is described below in detail by using the drawings. FIG. 1 is a flowchart illustrating a configuration of a welding method of a diffusion bonded structure. The welding method of a diffusion bonded structure includes a buffer layer formation step (S10) and a welding step (S12).

Figure 2A:
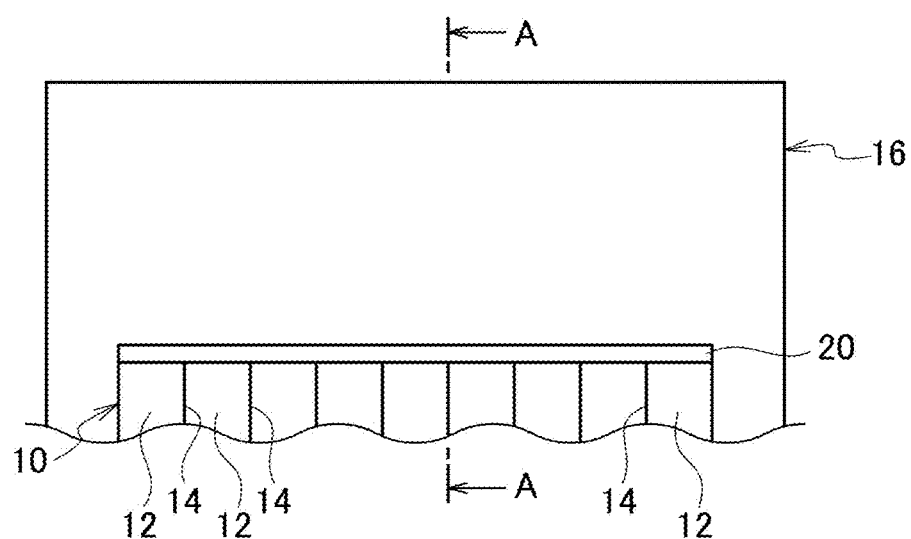
FIG. 2A is an overall schematic view for explaining a buffer layer formation step in the embodiment of the present disclosure.
Figure 2B:
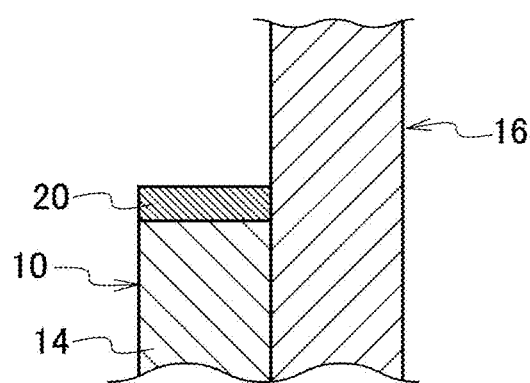
FIG. 2B is a schematic view of a cross section taken along the direction A-A in FIG. 2A for explaining a buffer layer formation step in the embodiment of the present disclosure.

The buffer layer formation step (S10) is a step of forming a buffer layer in a welding region including diffusion bonded joints of a diffusion bonded structure formed by diffusion bonding metal parts to each other, the buffer layer having higher ductility than the diffusion bonded joints. FIG. 2A and FIG. 2B are views for explaining the buffer layer formation step (S10), FIG. 2A is an overall schematic view, and FIG. 2B is a schematic view of a cross section taken along the direction A-A in FIG. 2A.

The diffusion bonded structure 10 is described. The diffusion bonded structure 10 is formed by diffusion bonding metal parts 12 to each other. The metal parts 12 are made of a Ni alloy such as Inconel 625, Inconel 617, or Haynes alloy 230, a stainless steel such as an austenitic stainless steel, or the like. The diffusion bonded structure 10 is formed by a general diffusion bonding method for a metal material. The diffusion bonded structure 10 includes diffusion bonded joints 14 where the metal parts 12 are diffusion bonded to each other.

Figure 3:
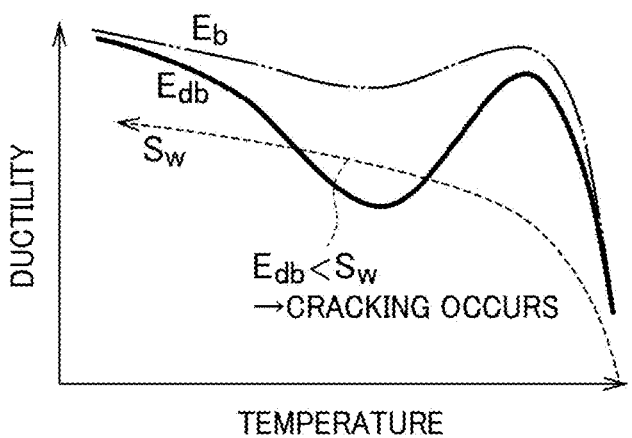
FIG. 3 is a graph for explaining ductility of diffusion bonded joints and ductility of metal parts which are base metal in the embodiment of the present disclosure.

When the diffusion bonded structure 10 is bonded to another part 16 by fusion welding (hereafter also referred to as "normal welding") in the welding step (S12) to be described later, the diffusion bonded joints 14 are heated to high temperature in the normal welding. The ductility of the diffusion bonded joints 14 tends to decrease at high temperature more than the ductility of the metal parts 12 which are base metal. Since the diffusion bonded joints 14 are heated to high temperature in the normal welding, the ductility of the diffusion bonded joints 14 decreases. FIG. 3 is a graph for explaining the ductility of the diffusion bonded joints 14 and the ductility of the metal parts 12 which are the base metal. In FIG. 3, the horizontal axis represents temperature, the vertical axis represents ductility, the solid line illustrates a ductility curve ($E_{db}$) of the diffusion bonded joints 14, and the two-dot chain line illustrates a ductility curve ($E_b$) of the metal parts 12. The ductility of the diffusion bonded joints 14 decreases more than the ductility of the metal parts 12 which are the base metal in a high temperature region. When the metal parts 12 are made of a Ni alloy or a stainless steel, the temperature region in which the ductility of the diffusion bonded joints 14 decreases is generally a temperature region around 1000° C.

In FIG. 3, the broken line illustrates a strain curve ($S_w$) of strain caused by the normal welding in the case where the diffusion bonded structure 10 is bonded to the another part 16 by the normal welding. When the diffusion bonded structure 10 is bonded to the another part 16 by the normal welding, deformation is constrained and the strain caused by the normal welding is thus large. In a temperature region in which the strain curve ($S_w$) intersects the ductility curve ($E_{db}$) of the diffusion bonded joints 14 and exceeds the ductility curve ($E_{db}$), ductility dip cracking which is one type of hot cracking may occur in the diffusion bonded joints 14. The larger the constraint in the normal welding is, the more likely the ductility dip cracking in the diffusion bonded joints 14 is to occur. Such welding with large constraint includes, for example, patch welding and the like.

A buffer layer 20 is formed as a welding region including the diffusion bonded joints 14 of the diffusion bonded structure 10. The buffer layer 20 has higher ductility than the diffusion bonded joints 14. The buffer layer 20 has a function of absorbing and buffering the strain caused by the normal welding in the welding step (S12) to be described later.

Figure 4:
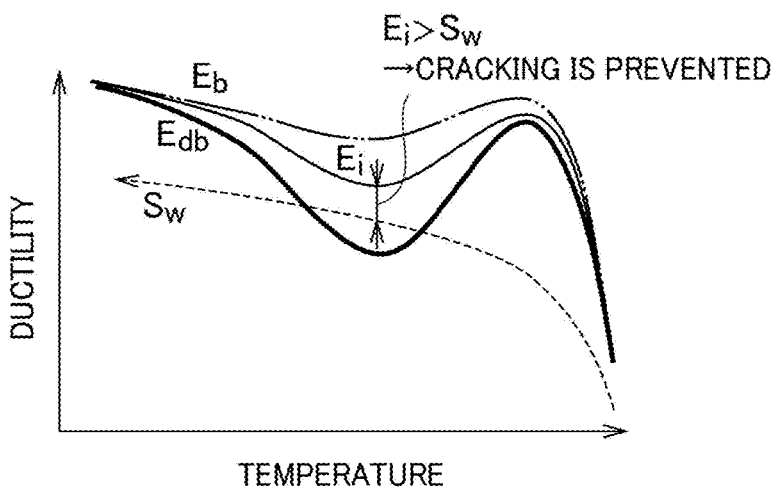
FIG. 4 is a graph for explaining the ductility of the diffusion bonded joints, the ductility of the metal parts which are the base metal, and ductility of a buffer layer in the embodiment of the present disclosure.

FIG. 4 is a graph for explaining the ductility of the diffusion bonded joints 14, the ductility of the metal parts 12 which are the base metal, and the ductility of the buffer layer 20. In FIG. 4, the horizontal axis represents temperature, the vertical axis represents ductility, the bold solid line illustrates the ductility curve ($E_d$) of the diffusion bonded joints 14, the two-dot chain line illustrates the ductility curve ($E_b$) of the metal parts 12 which are the base metal, and the thin solid line illustrates a ductility curve ($E_i$) of the buffer layer 20. Moreover, in FIG. 4, the broken line illustrates the strain curve ($S_w$) of the strain caused by the normal welding in the case where the diffusion bonded structure 10 is bonded to the another part 16 by the normal welding.

The ductility of the buffer layer 20 is higher than that of the diffusion bonded joints 14 at high temperature. As a result, the ductility curve ($E_i$) of the buffer layer 20 does not intersect the strain curve ($S_w$) and is located above the strain curve ($S_w$). The buffer layer 20 thus absorbs and buffers the strain caused by the normal welding when the diffusion bonded joints 14 provided with the buffer layer 20 is bonded to the another part 16 by the normal welding in the welding step (S12) to be described later, and cracking in the diffusion bonded joints 14 is thereby suppressed. The thickness of the buffer layer 20 varies depending on the metal material forming the buffer layer 20, constraint conditions of the normal welding, and the like and is, for example, about 1 mm to 10 mm.

Since the buffer layer 20 is formed in the welding region including the diffusion bonded joints 14 of the diffusion bonded structure 10 and there is almost no constraint of the another part 16 in buffer layer formation, the buffer layer 20 can easily deform. Accordingly, the constraint in the buffer layer formation is smaller than the constraint in the normal welding in the welding step (S12) to be described later and the strain caused by the buffer layer formation can be thus made smaller than the strain caused by the normal welding.

Figure 5:
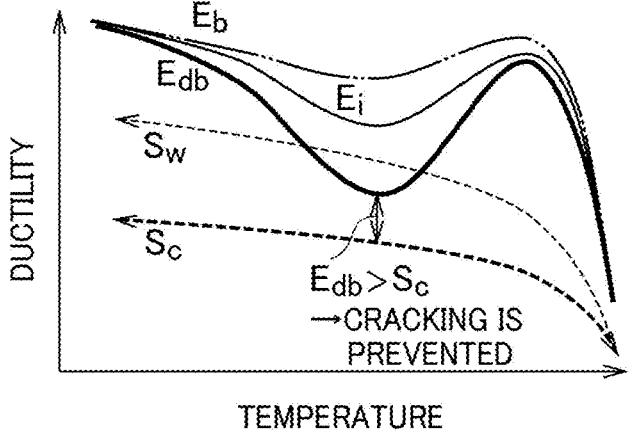
FIG. 5 is a graph illustrating relationships between the ductility of the diffusion bonded joints and strain occurring in buffer layer formation in the embodiment of the present disclosure.

FIG. 5 is a graph illustrating relationships between the ductility of the diffusion bonded joints 14 and the strain caused by the buffer layer formation. In FIG. 5, the horizontal axis represents temperature, the vertical axis represents ductility, the bold solid line illustrates the ductility curve ($E_{db}$) of the diffusion bonded joints 14, the two-dot chain line illustrates the ductility curve ($E_b$) of the metal parts 12 which are the base metal, and the thin solid line illustrates the ductility curve ($E_i$) of the buffer layer 20. Moreover, in FIG. 5, the broken lines illustrate the strain curve ($S_c$) of the strain caused by the buffer layer formation and the strain curve ($S_w$) of the strain caused by the normal welding.

Since the constraint in the buffer layer formation is smaller than that in the normal welding in the welding step (S12) to be described later, the strain curve ($S_c$) is located below the strain curve ($S_w$). As a result, the strain curve ($S_c$) does not intersect the ductility curve ($E_{db}$) of the diffusion bonded joints 14 and is located below the ductility curve ($E_{db}$). Cracking in the diffusion bonded joints 14 can be thus suppressed in the buffer layer formation.

The buffer layer 20 may be made of the same kind of material as the metal parts 12 which are the base metal. The buffer layer 20 being made of the same kind of material as the metal parts 12 can suppress local deformation due to strength distribution, galvanic corrosion, and contamination from an interface between different materials (mixing of foreign objects). For example, when the metal parts 12 are made of a Ni alloy, the buffer layer 20 can be made of the Ni alloy. Moreover, the buffer layer 20 may be made of a metal material with the same alloy composition as the metal parts 12. For example, when the metal parts 12 are made of Haynes alloy 230, the buffer layer 20 can be made of a metal material with the same alloy composition as Haynes alloy 230.

The buffer layer 20 may be made of a material different from the metal parts 12 which are the base metal. When the buffer layer 20 is to be made of a material different from the metal parts 12, a soft material with lower yield stress and higher ductility than the metal parts 12 may be used for the buffer layer 20. Using such soft material can cause the strain caused by the normal welding to be concentrated in the buffer layer 20 and also prevents the stress equal to or larger than the yield stress of the buffer layer 20 from being applied to the diffusion bonded joints 14. A cracking prevention effect equal to or higher than that in the case where the buffer layer 20 is made of the same kind of material as the metal parts 12 can be thereby obtained even when the thickness of the buffer layer 20 is made smaller than that in the case where the buffer layer 20 is made of the same kind of material as the metal parts 12.

As a method of forming the buffer layer 20, a formation method with lower constraint may be used to further reduce the strain caused by the buffer layer formation. As such a method of forming the buffer layer 20, overlay welding (buttering) may be used. The overlay welding (buttering) is a method of overlaying weld metal to be deposited in the welding region including the diffusion bonded joints 14. Accordingly, there is almost no constraint and the strain caused by the buffer layer formation can be further reduced. Shielded metal arc welding (SMAW), MIG welding, TIG welding, resistance welding, laser welding, electron beam welding, thermal spraying, or the like can be performed as a process used in the overlay welding. The same kind of material as the metal parts 12 or a material different from the metal parts 12 can be used as a welding material. A metal material with the same alloy composition as the metal parts 12 can be used as the welding material. When the buffer layer 20 is to be formed by the overlay welding, the buffer layer 20 may be formed by forming a welding bead in one pass or two or more. Moreover, the buffer layer may be formed without using the welding material, by locally melting and solidifying a surface portion without using a filler. In addition to the overlay welding, butt welding of thin plate metal pieces, lap welding of thin plate metal pieces, and the like can be used as the above method of forming the buffer layer 20.

As a method of forming the buffer layer 20, solid state bonding in which strain due to temperature change is small and in which strain caused by melting and solidification does not occur may be used to further reduce the strain caused by the formation of the buffer layer 20. As such a method of forming the buffer layer 20, powder sintering, ultrasonic welding, friction welding, friction surfacing, friction stir welding, friction stir processing, diffusion bonding, brazing, magnetic pulse welding, explosive welding, and the like can be used.

In the method of forming the buffer layer 20, a formation method with small constraint and a solid state bonding with small strain may be used in combination. As such a method of forming the buffer layer 20, for example, the overlay welding may be performed by friction surfacing with low heat input. This further reduces the strain caused by the buffer layer formation and cracking in the diffusion bonded joints 14 can be thus further suppressed.

Figure 6A:
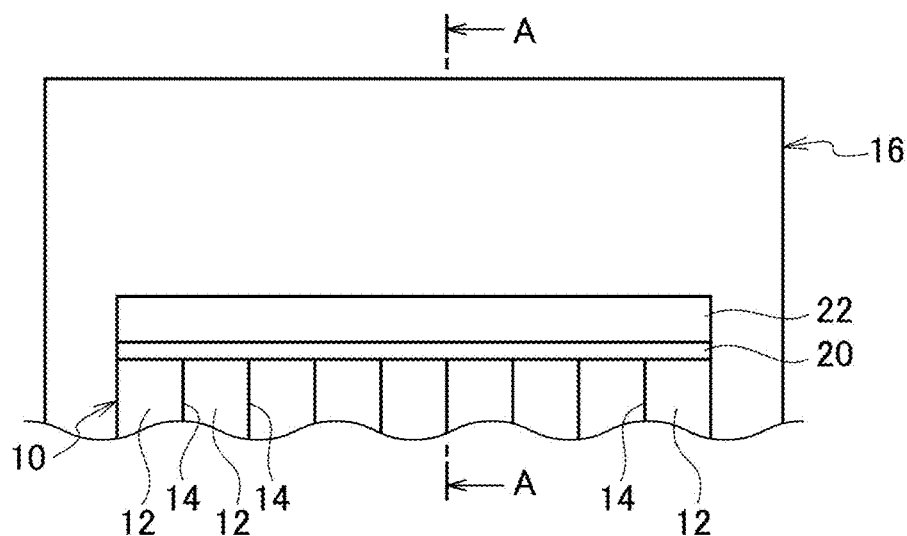
FIG. 6A is an overall schematic view for explaining a welding step in the embodiment of the present disclosure.
Figure 6B:
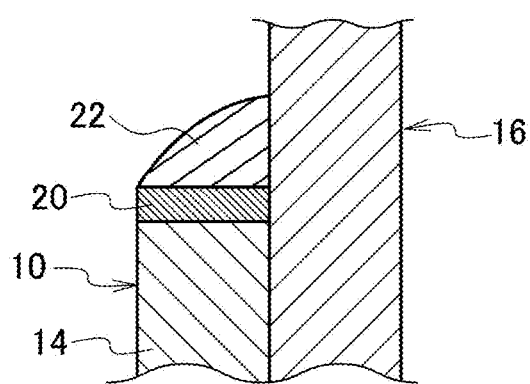
FIG. 6B is a schematic view of a cross section taken along the direction A-A of FIG. 6A for explaining a welding step in the embodiment of the present disclosure.

The welding step (S12) is a step of bonding the welding region of the diffusion bonded structure 10 in which the buffer layer 20 is formed to the another part 16 by performing fusion welding from above the buffer layer 20. FIG. 6A and FIG. 6B are views for explaining the welding step (S12), FIG. 6A is an overall schematic view, and FIG. 6B is a schematic view of a cross section taken along the direction A-A of FIG. 6A.

The welding region of the diffusion bonded structure 10 in which the buffer layer 20 is formed is bonded to the another part 16 by the normal welding from above the buffer layer 20. A welding layer 22 is formed by this welding and the diffusion bonded structure 10 is bonded to the another part 16 by welding. As the normal welding, a general welding method such as arc welding, shielded metal arc welding (SMAW), TIG welding, or MIG welding can be used. For example, arc welding can be performed by forming multiple welding beads by shielded metal arc welding (SMAW) with high heat input or the like. The same kind of material as the metal parts 12 or a material different from the metal parts 12 may be used as a welding material. A metal material with the same alloy composition as the metal parts 12 can be used as the welding material.

Even when the diffusion bonded structure 10 is bonded to the another part 16 by the normal welding and is constrained, the buffer layer 20 absorbs and buffers the strain caused by the normal welding and cracking in the diffusion bonded joints 14 is thus suppressed. In detail, as described in FIG. 4, the strain curve ($S_w$) of the strain caused by the normal welding is located below the ductility curve ($E_i$) of the buffer layer 20. The buffer layer 20 thus absorbs and buffers the strain caused by the normal welding even when the ductility of the diffusion bonded joints 14 decreases in the normal welding, and cracking in the diffusion bonded joints 14 is thereby prevented.

The above welding method of the diffusion bonded structure 10 may be used also when the diffusion bonded structure 10 and the another part 16 are fusion welded by a joint welding method. Such fusion welding by the joint welding method can be patch welding, butt welding, fillet welding, or lap welding. Moreover, the above welding method of the diffusion bonded structure 10 can be used in a joint welding method in which the parts are fuse welded to form a shape with a high degree of constraint such as patch welding or the like. For example, a reaction container used in a heat exchange reactor handles highly corrosive fluid at high temperature and high pressure and is thus a high stiffness reaction container formed of a thick plate of Ni alloy parts. This reaction container is formed of a diffusion bonded structure formed by diffusion bonding the Ni alloy parts. When this reaction container is to be attached to a thick plate flange, the reaction container is patch welded to the flange.

Since the stiffness of the reaction container and the stiffness of the flange are both high and these parts are patch welded to each other, strain caused by normal welding is large. Even in the patch welding with large constraint as described above, cracking in the diffusion bonded joints of the reaction container can be suppressed by forming the buffer layer in the welding region including the diffusion bonded joints of the reaction container and then bonding the flange and the reaction container by performing the normal welding from above the buffer layer.

As described above, according to the above configuration, the welding method includes the buffer layer formation step of forming the buffer layer in the welding region including the diffusion bonded joints of the diffusion bonded structure formed by diffusion bonding the metal parts to each other, the buffer layer having higher ductility than the diffusion bonded joints, and the welding step of bonding the welding region of the diffusion bonded structure in which the buffer layer is formed to the another part by performing fusion welding from above the buffer layer. Accordingly, the buffer layer absorbs and buffers the strain caused by the fusion welding and cracking in the diffusion bonded joints can be thereby suppressed.

EXAMPLES

A welding test of the diffusion bonded structure was performed.

Comparative Example

First, a welding method of a comparative example is described. A diffusion bonded structure was formed by diffusion bonding multiple Ni alloy parts. The Ni alloy parts were made of Haynes alloy 230. The diffusion bonded structure included a diffusion bonded joint between each pair of adjacent Ni alloy parts. In the welding method of the comparative example, a welding region including the diffusion bonded joints of the diffusion bonded structure and a metal block were arc welded to form a welding layer and the diffusion bonded structure was thus bonded to the metal block. A material with the same alloy composition as Haynes alloy 230 was used as a welding material.

Figure 7A:
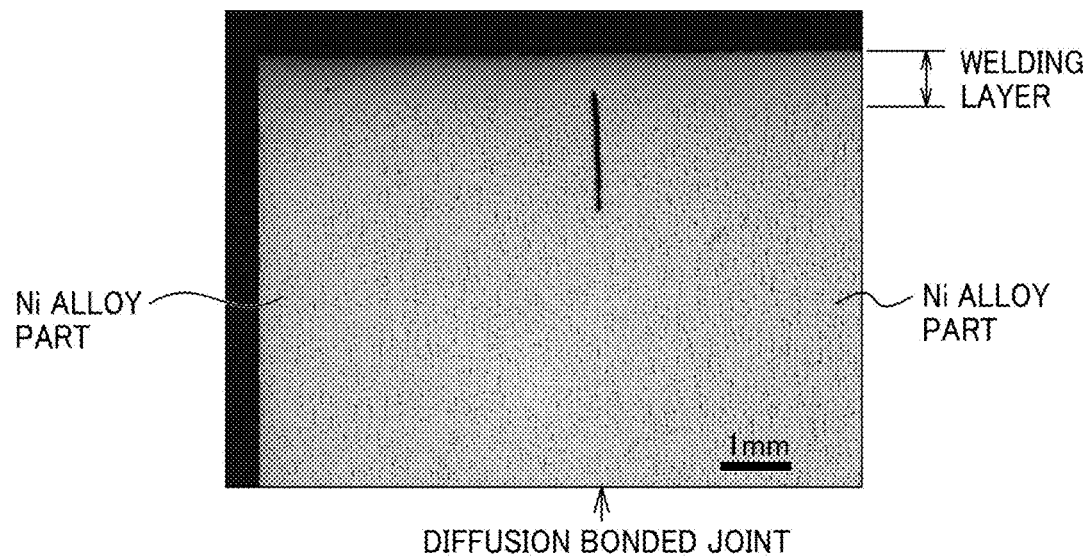
FIG. 7A includes a picture depicting a cross section of the diffusion bonded joints directly below the welding layer after arc welding in a welding method of a comparative example in the embodiment of the present disclosure.
Figure 7B:
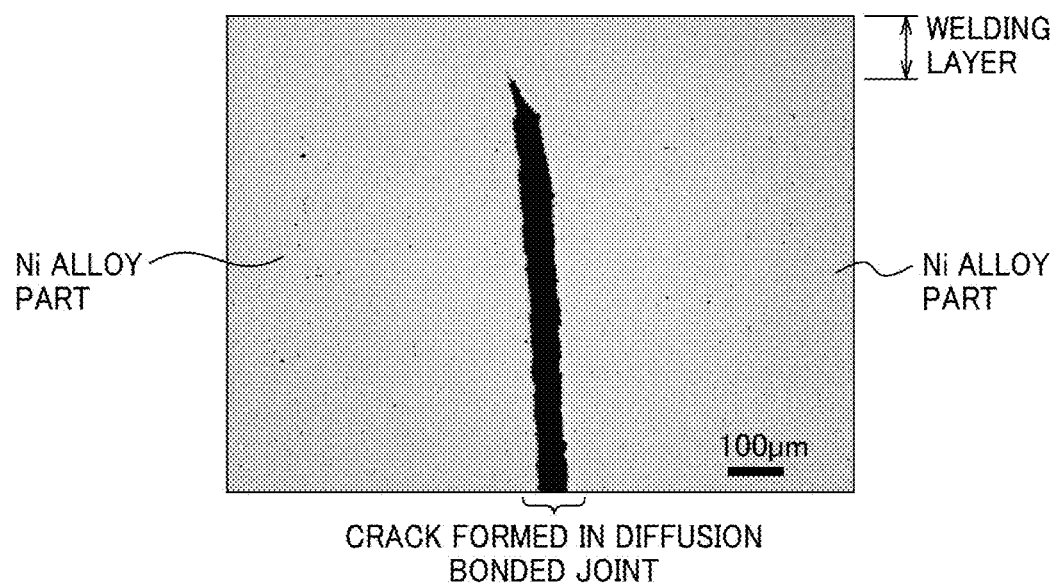
FIG. 7B includes an enlarged picture of a crack depicted in FIG. 7A after arc welding in a welding method of a comparative example in the embodiment of the present disclosure.

After the arc welding, the diffusion bonded joints directly below the welding layer was observed by using an optical microscope. FIG. 7A and FIG. 7B include pictures depicting observation results obtained by using the optical microscope after the arc welding in the welding method of the comparative example, FIG. 7A is a picture depicting a cross section of the diffusion bonded joints directly below the welding layer, and FIG. 7B is an enlarged picture of a crack depicted in FIG. 7A. A penetrating crack extending several millimeters or more was formed in the diffusion bonded joints directly below the welding layer. Note that no crack was formed in the welding layer and the Ni alloy parts which were the base metal.

Example

Next, a welding method of an example is described. The same diffusion bonded structure as one used in the welding method of the comparative example was used as a diffusion bonded structure. First, a buffer layer was formed in a welding region including diffusion bonded joints of the diffusion bonded structure by overlay welding. TIG welding was used as the overlay welding. The welding conditions were such that are voltage was 12 V, welding current was 80 A, and welding rate was 100 mm/min. The overlay welding was performed while using a filler. A material with the same alloy composition as Haynes alloy 230 was used as the filer. Two passes of the overlay welding were performed and a buffer layer formed of two overlay layers was formed. The thickness of the buffer layer was 2.5 mm. After the formation of the buffer layer, ultrasonic flaw inspection and penetrant inspection were performed to check that no crack was formed in the buffer layer and the diffusion bonded joints directly below the buffer layer.

Next, the welding region in which the buffer layer was formed and a metal block were arc welded to each other from above the buffer layer to form a welding layer and the diffusion bonded structure was thus bonded to the metal block. The arc welding was the same as the welding method in the comparative example. A material with the same alloy composition as Haynes alloy 230 was used as a welding material. After the arc welding, the welding layer was removed and the buffer layer and the diffusion bonded joints directly below the buffer layer were observed by using the optical microscope.

Figure 8A:
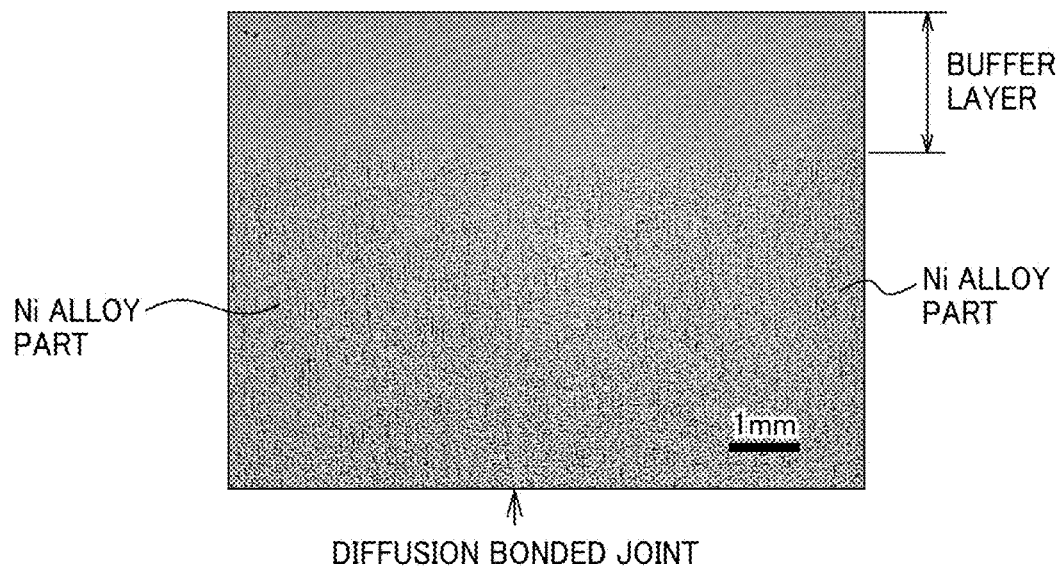
FIG. 8A includes a picture depicting the diffusion bonded joints directly below the buffer layer after arc welding in a welding method of an example in the embodiment of the present disclosure.
Figure 8B:
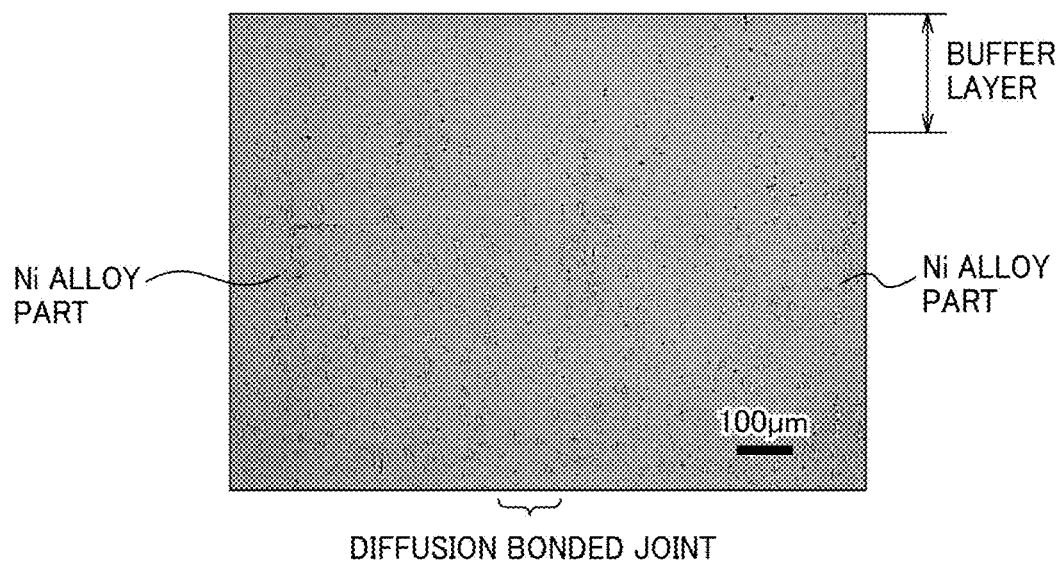
FIG. 8B includes an enlarged picture of FIG. 8A after arc welding in a welding method of an example in the embodiment of the present disclosure.

FIG. 8A and FIG. 8B include pictures depicting observation results obtained by using the optical microscope after the arc welding in the welding method of the example, FIG. 8A is a picture depicting the diffusion bonded joints directly below the buffer layer, and FIG. 8B is an enlarged picture of FIG. 8A. No formation of crack was confirmed in the buffer layer and the diffusion bonded joints directly below the buffer layer. From these results, it is found that forming the buffer layer in the welding region including the diffusion bonded joints and performing the arc welding from above the buffer layer causes the buffer layer to absorb and buffer the strain caused by the arc welding and cracking in the diffusion bonded joint can be thereby suppressed.

In the present disclosure, the buffer layer absorbs and buffers the strain caused by the fusion welding and cracking in the diffusion bonded joints of the diffusion bonded structure can be thereby suppressed. Accordingly, the present disclosure is useful in a reaction container of a heat exchange reactor and the like.

What is claimed is:

1. A welding method of a diffusion bonded structure in which the diffusion bonded structure formed by diffusion bonding metal parts to each other is bonded to another part by fusion welding, the welding method comprising:
    a buffer layer forming step of forming a buffer layer in a welding region including a diffusion bonded joint of the diffusion bonded structure, the buffer layer having higher ductility than the diffusion bonded joint in a high temperature region in which the ductility of the diffusion bonded joint decreases; and
    a welding step of bonding the welding region in which the buffer layer is formed to the another part by performing the fusion welding from above the buffer layer in the high temperature region in which the ductility of the diffusion bonded joint decreases,
    wherein the metal parts are made of a Ni alloy or a stainless steel.

2. The welding method of a diffusion bonded structure according to claim 1, wherein, in the buffer layer forming step, the buffer layer is formed by overlay welding.

3. The welding method of a diffusion bonded structure according to claim 1, wherein, in the buffer layer forming step, the buffer layer is formed by any one of processes of powder sintering, ultrasonic welding, friction welding, friction surfacing, friction stir welding, friction stir processing, diffusion bonding, brazing, magnetic pulse welding, and explosive welding.

4. The welding method of a diffusion bonded structure according to claim 1, wherein the diffusion bonded structure is fusion welded to the another part by a joint welding method.

5. The welding method of a diffusion bonded structure according to claim 2, wherein the diffusion bonded structure is fusion welded to the another part by a joint welding method.

6. The welding method of a diffusion bonded structure according to claim 3, wherein the diffusion bonded structure is fusion welded to the another part by a joint welding method.

7. The welding method of a diffusion bonded structure according to claim 4, wherein the fusion welding by the joint welding method is patch welding, butt welding, fillet welding, or lap welding.

8. The welding method of a diffusion bonded structure according to claim 5, wherein the fusion welding by the joint welding method is patch welding, butt welding, fillet welding, or lap welding.

9. The welding method of a diffusion bonded structure according to claim 6, wherein the fusion welding by the joint welding method is patch welding, butt welding, fillet welding, or lap welding.

10. The welding method of a diffusion bonded structure according to claim 1, wherein the metal parts and the buffer layer are made of a Ni alloy.

11. The welding method of a diffusion bonded structure according to claim 1, wherein the metal parts and the buffer layer are made of a stainless steel.

12. The welding method of a diffusion bonded structure according to claim 1, wherein the metal parts and the buffer layer are made of metal materials with the same alloy composition.

\* \* \* \* \*